US012363161B2

United States Patent
Oest et al.

(10) Patent No.: US 12,363,161 B2
(45) Date of Patent: Jul. 15, 2025

(54) NEUTRALIZING EVASION TECHNIQUES OF MALICIOUS WEBSITES

(71) Applicant: PayPal, Inc., San Jose, CA (US)

(72) Inventors: Adam Oest, Scottsdale, AZ (US); Penghui Zhang, Phoenix, AZ (US); Raoul Johnson, Scottsdale, AZ (US)

(73) Assignee: PayPal, Inc., San Jose, CA (US)

( * ) Notice: Subject to any disclaimer, the term of this patent is extended or adjusted under 35 U.S.C. 154(b) by 566 days.

(21) Appl. No.: 17/079,190

(22) Filed: Oct. 23, 2020

(65) Prior Publication Data

US 2022/0131877 A1  Apr. 28, 2022

(51) Int. Cl.
*H04L 9/40* (2022.01)
*G06F 16/23* (2019.01)

(52) U.S. Cl.
CPC ........ *H04L 63/145* (2013.01); *G06F 16/2379* (2019.01); *H04L 63/1416* (2013.01)

(58) Field of Classification Search
CPC .............. H04L 63/145; H04L 63/1416; G06F 16/2379
See application file for complete search history.

(56) References Cited

U.S. PATENT DOCUMENTS

| | | | | |
|---|---|---|---|---|
| 8,521,667 B2 * | 8/2013 | Zhu | ..................... | H04L 63/1408 706/13 |
| 10,356,050 B1 * | 7/2019 | Kumar | ..................... | H04L 67/02 |
| 10,616,255 B1 * | 4/2020 | Strauss | ................... | H04L 63/10 |
| 10,747,881 B1 * | 8/2020 | Luo | .......................... | G06F 9/54 |
| 11,470,113 B1 * | 10/2022 | Orhan | ................. | H04L 63/1425 |
| 11,811,793 B2 * | 11/2023 | Sandke | ............... | H04L 63/1416 |
| 2014/0059649 A1 * | 2/2014 | Hu | ........................... | H04L 63/08 726/3 |
| 2014/0331319 A1 * | 11/2014 | Munro, IV | .......... | H04L 63/1441 726/22 |
| 2016/0065613 A1 * | 3/2016 | Cho | ..................... | H04L 63/1416 726/23 |
| 2016/0330215 A1 * | 11/2016 | Gafni | ....................... | H04L 63/14 |
| 2019/0108338 A1 * | 4/2019 | Saxe | ..................... | G06F 21/562 |

(Continued)

FOREIGN PATENT DOCUMENTS

| | | | | |
|---|---|---|---|---|
| CN | 111339532 A | * | 6/2020 | ........... G06F 21/566 |
| WO | WO-2016173200 A1 | * | 11/2016 | ............. G06F 21/56 |

OTHER PUBLICATIONS

CrawlPhish: Large-scale Analysis of Client-side Cloaking Techniques in Phishing (Year: 2020).*

(Continued)

*Primary Examiner* — Lynn D Feild
*Assistant Examiner* — Saad Ahmad Abdullah
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to methods that include a process, executing on a computer system, receiving a request to access a website, and altering the request to include one or more characteristics of anti-malware scanners. The method further includes the process sending the altered request to the website, and receiving a response to the altered request. The method also includes the process detecting whether the received response utilizes one of a known set of anti-malware cloaking techniques, and providing, based on the detecting, an output indicative of an outcome of the altered request.

20 Claims, 9 Drawing Sheets

(56) References Cited

U.S. PATENT DOCUMENTS

| | | | |
|---|---|---|---|
| 2021/0092155 A1* | 3/2021 | Wang | H04L 63/083 |
| 2021/0120034 A1* | 4/2021 | Starov | G06F 16/2379 |
| 2022/0038424 A1* | 2/2022 | Liu | H04L 63/1416 |
| 2022/0217160 A1* | 7/2022 | Morgan | H04L 63/1425 |

OTHER PUBLICATIONS

"Luca Invernizzi, Cloak of Visibility: Detecting When Machines Browse a Different Web, 2016, IEEE" (Year: 2016).*

Zhang et al., "CrawlPhish: Large-scale Analysis of Client-side Cloaking Techniques in Phishing," Semantic Scholar, Corpus ID: 221094113, published 2020, 16 pages.

Oest et al., "Inside a Phisher's Mind: Understanding the Anti-phishing Ecosystem Through Phishing Kit Analysis," 2018 APWG Symposium on Electronic Crime Research (eCrime), San Diego, CA, 2018, pp. 1-12, doi: 10.1109/ECRIME.2018.8376206.

Aggarwal et al., "Automatic Realtime Phishing Detection on Twitter," Phish Art, 27 pages.

Oest et al., "Sunrise to Sunset: Analyzing the End-to-end Life Cycle and Effectiveness of Phishing Attacks at Scale," https://www.usenix.org/system/files/sec20fall_oest_prepub.pdf; 17 pages.

Whittaker et al., "Large-Scale Automatic Classification of Phishing Pages," Conference: Proceedings of the Network and Distributed System Security Symposium, NDSS 2010, Feb. 28-Mar. 3, 2010, 14 pages.

Oest et al., "PhishFarm: A Scalable Framework for Measuring the Effectiveness of Evasion Techniques Against Browser Phishing Blacklists," 2019 IEEE Symposium on Security and Privacy (SP), San Francisco, CA, USA, 2019, pp. 1344-1361, doi: 10.1109/SP.2019.00049.

Oest et al., "PhishTime: Continuous Longitudinal Measurement of the Effectiveness of Anti-phishing Blacklists," Proceedings of the 29th USENIX Security Symposium, Aug. 12-14, 2020, 18 pages.

* cited by examiner

800 sending, by the process executing on the computer system, a different request that includes at least one different known trigger for anti-malware cloaking techniques than the altered request.
810 receiving, by the process, a different response to the different requests.
820 comparing, by the process, the received response to the different response.
830 detecting, by the process, differences between the received response and the different response.
840 blocking, by the process from a display of the computer system, content received in the response.
850 displaying, by the process on the display, a warning to a user of the computer system.
860

FIG. 8

NEUTRALIZING EVASION TECHNIQUES OF MALICIOUS WEBSITES

BACKGROUND

Technical Field

This disclosure relates generally to computer system operation, and more particularly to protecting computer users from malicious websites.

Description of the Related Art

Online security is a serious concern for users of the internet. Malicious entities across the world attempt to scam users or gain access to users' personal information for financial gain, personal attacks, and other illegal and/or unethical reasons. One form of online attack involves attempting to get a user to visit a malicious website that is posing as a legitimate website in order to trick the user into divulging personal information. These "phishing" attacks use deceitful websites that mimic the appearance of legitimate websites such as financial institutions, online retailers, social media, and such, in order to trick the user into providing login information, credit card data, or other personal information that the user would not otherwise share.

As a defense against illegitimate websites, multiple online entities utilize programs such as "web crawlers" to identify malicious websites and log information associated with these websites, including uniform resource locators (URLs), internet protocol (IP) addresses, and/or other similar information. For example, an online entity using the URL www-.companyexample.com may utilize a web crawler to continuously or periodically access variations of this URL (e.g., www.companyexample.net, www.company_example.com, etc.) to determine if such variations are valid websites, and if so, whether they request personal information from the user. Identified websites may be logged and confirmed as malicious and then added to a list of known malicious websites. Such a list may be made available to various web browsers, email programs, and other internet accessing programs.

BRIEF DESCRIPTION OF THE DRAWINGS

FIG. 8 shows a flow diagram of an embodiment of a method for blocking users from malicious websites.

DETAILED DESCRIPTION

Figure 1:
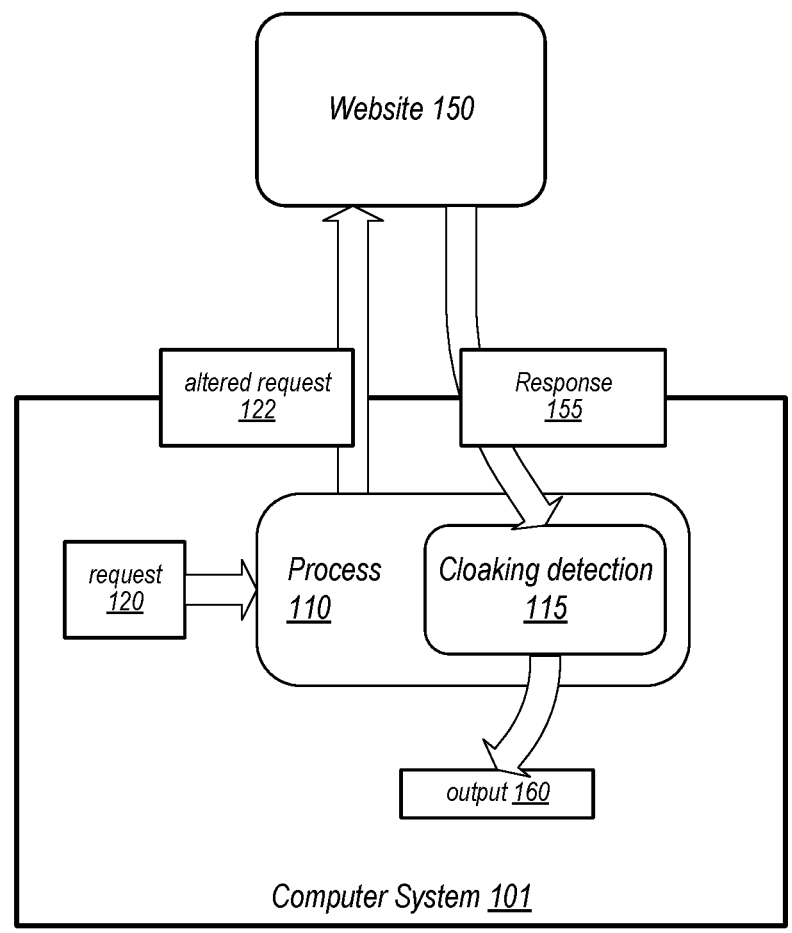
FIG. 1 is a block diagram illustrating an embodiment of a computer system requesting content from a website.

As described above, web crawlers (or "bots") may be utilized to identify malicious websites, allowing a list of known or suspected malicious websites, and in some cases, a list of known or presumed safe websites, to be generated and available for use by various programs used to access internet content. As used herein, a "web crawler" is a process operating on a computer system that is connected to the internet and that identifies websites across the internet and sends requests for content from new or otherwise unknown websites. Web crawlers may be used for a variety of tasks, including tracking/cataloging active websites, building search databases, and, as described in more detail herein, to identify malicious websites. Such web crawlers that identify malicious websites are referred to herein as "anti-malware" scanners. For example, a web browser may, in response to a user clicking a link, compare a URL associated with the link to various URLs in one or more available deny-lists and/or allow-list. A hit on a deny-list may result in the web browser denying the user access to the linked website and/or a warning message regarding the potential security risk associated with the linked website. In contrast, a hit on a allow-list may indicate the website has a low security risk and retrieve content from the website to display to the user.

In some embodiments, an anti-malware scanner may be operated within a web browser to identify malicious behavior by content included within a web page. For example, malicious page content may include code, such as a JavaScript™-based program, that scans a user's computer for sensitive information. An in-browser anti-malware scanner, implemented, for example, as a browser extension, may scan received page content to detect such unauthorized behavior as it is occurring, or even detect the malicious JavaScript before it is allowed to execute.

Some malicious entities, however, have developed methods of hiding their websites from various anti-malware scanners to avoid detection. Using cloaking techniques, malicious websites may detect some types of anti-malware scanners before an anti-malware scanner detects the malicious website and, therefore, avoid being deny-listed. Cloaking techniques refer to methods of identifying characteristics of one or more types of anti-malware scanners and in response to receiving an access request from an identified anti-malware scanner, presents alternative content that includes no indications of malicious intent. A response that uses a cloaking technique may include one or more recognizable characteristics. For example, a cloaking response may provide a content indicative of an access error, such as a "page could not be found" response. This may trick the anti-malware scanner into behaving as if the URL is not associated with a valid website and leave the malicious website URL off of a respective deny-list.

The present disclosure recognizes that these cloaking techniques may be used to protect users from unknowingly accessing malicious websites. One embodiment of a method includes, in response to a request to access a website with an unknown security risk, altering the request to include one or more characteristics of anti-malware scanners. The altered request is sent to the website, and a response is received. The received response is analyzed to determine if it utilizes one of a known set of anti-malware cloaking characteristics. Based on this determination, an output indicative of the security risk may be generated, and appropriate actions may be taken to protect the user, if necessary. In this manner, a website request may be altered in a manner to make the request appear to be associated with a website scanner, potentially provoking a cloaking response that could be used to discern if the website is malicious or not.

Use of such a method may increase a level of protection for the user by alerting the user of possible malicious behavior by the website. In addition, malicious websites that may be overlooked by traditional anti-malware scanners may be detected and logged. As a result of such logging, the detected website may be added to one or more deny-lists. Other users who do not directly utilize the disclosed methods may then be shown warnings if they attempt to access a website included in the one or more deny-lists.

A block diagram of an embodiment of a system that includes a computer system accessing a website is illustrated in FIG. 1. System 100 includes computer system 101 receiving request 120 to access website 150. Computer system 101 includes process 110 that receives request 120 and that further includes cloaking detection module 115.

As illustrated, computer system 101 may represent a client computer system used to access website 150. Computer system 101 may be any suitable type of computer system, including for example, a desktop or laptop personal computer, a server computer system, a tablet computer, a smartphone, a virtual assistant device, or any similar computing device capable of accessing web-based content. A user may access one or more websites via computer system 101.

Process 110, as shown, is a computer program configured to receive requests to access various websites, determine if the requested website poses a security risk and take appropriate action to protect the user from potentially malicious websites. In some embodiments, process 110 is a browser, an email program, or other application configured to access the internet. In other embodiments, process 110 is an add-on module configured to operate within a different application, such as a plug-in module for a web browser installed on computer system 101.

As shown, process 110 receives request 120 to access website 150. Request 120 may correspond to the user typing in a URL in a browser, clicking on a link embedded in a displayed web page or email, launching a particular application, or any other suitable action that causes a computer system to access a website. Process 110 alters request 120 to include one or more characteristics of anti-malware scanners, resulting in altered request 122. Details of various characteristics of anti-malware scanners are discussed below, but may include replacing a hostname and/or an IP address associated with a source of request 120.

Process 110, as illustrated, sends altered request 122 to website 150. Website 150 may send response 155 to computer system 101. Process 110, in turn, receives response 155 that is associated with altered request 122. Response 155 may include, for example, content for a web page to be displayed, or may include one or more error messages regarding the attempted access, such as an http 404 error that indicates a web page or server associated with altered request 122 was not found.

As shown, process 110 detects, using cloaking detection module 115, whether the received response 155 utilizes one of a known set of anti-malware cloaking techniques. Anti-malware cloaking techniques may include, for example, an error message or a web page that includes no dialog boxes for inputting data. In some embodiments, request 120 may be altered in a plurality of different manners, each different from one another, and sent to website 150, thereby generating a plurality of responses. Respective responses to each of the altered requests may be compared to determine if any response differs from others. In some embodiments, one request may be sent unaltered, or altered only to obfuscate any personal information of the user. A corresponding response from such an unaltered request may be compared to one or more responses to altered requests that include characteristics of anti-malware scanners. Differences between these respective responses may be indicative of cloaking techniques.

Process 110, as illustrated, provides, based on the detecting, output 160 indicative of an outcome of altered request 122. For example, if indications of cloaking techniques are detected, then process 110 may generate output 160 that causes computer system 101 to block any content from response 155 from being displayed to the user. In other embodiments, a warning may be displayed indicating that the requested website poses a security risk. In some embodiments, a database used to track malicious websites may be updated to indicate characteristics of the detected cloaking techniques. Such characteristics may include differences between received responses to various altered and unaltered requests, as well as indications of what alterations were included in corresponding requests. Such a database may be further used to update one or more website deny-lists.

Across various embodiments of computer system 101, variations of request 120 may be received for accesses to multiple different embodiments of website 150. Process 110 may be implemented in such a manner to be compatible with various computer systems, recognize various requests, and interpret results from the multiple websites.

Use of such techniques may provide protection for users accessing websites that may otherwise be undetected by anti-malware scanners due to the website's use of cloaking techniques. In addition to providing additional protection to the user that is requesting access to a cloaked malicious website, the cloaked malicious website may be detected and added to one or more deny-lists, thereby protecting other users that may be deceived into access the same malicious website at a later point in time.

It is noted that the embodiment of FIG. 1 is merely an example. Features of the system have been simplified for clarity. As disclosed, the described computer system 101 may represent a client computer system. In other embodiments, computer system 101 may be server computer acting as a gateway between a client computer and other computer systems coupled to the internet. For example, computer system 101 may be a server computer system operating as a virtual private network for one or more client computer systems.

The system of FIG. 1 describes a malicious website that utilizes cloaking techniques to avoid detection by anti-malware scanners. An example of a particular type of malicious website and an anti-malware scanner used to detect it are shown in FIG. 2.

Figure 2:
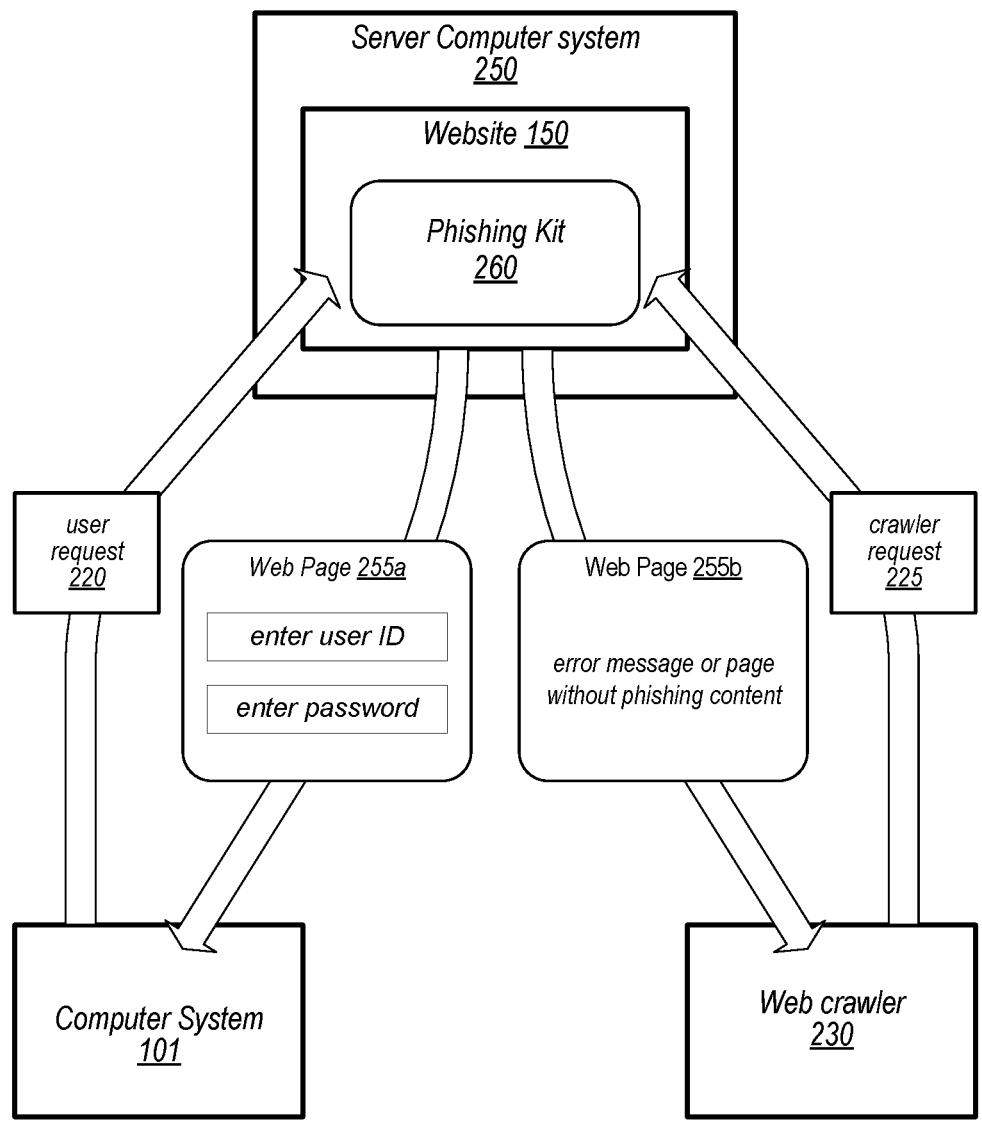
FIG. 2 shows a block diagram of an embodiment of a computer system and a web crawler requesting content from a same website.

Moving to FIG. 2, an embodiment of system 200 is shown that includes computer system 101, web crawler 230, and server computer system 250. Server computer system 250 hosts website 150, which is a malicious website operated by a malicious entity. As illustrated, computer system 101 and web crawler 230 send user request 220 and crawler request 225, respectively, to website 150 on server computer system 250. Using phishing kit 260, website 150 responds to the respective requests with web pages 255a and 255b.

Computer system 101, as shown, sends user request 220 to website 150. User request 220 is a request by a genuine user to access content provided by server computer system 250. Crawler request 225 is a request by an automated anti-malware scanner (web crawler 230) that is intended to appear to website 150 as a request from a genuine user for provided content. Server computer system 250 may, in some embodiments, be a computer system owned and/or operated by a malicious entity. In other embodiments, server computer system 250 may be a part of a legitimate web hosting service providing web hosting services to a variety of customers, wherein at least one customer is the malicious entity operating website 150.

This malicious entity installs phishing kit 260 on server computer system 250 with a goal of collecting personal and/or secure information from a plurality of users, operating what is commonly referred to as a phishing attack. Phishing kit 260 is included in website 150 that, in turn, is linked to one or more URLs that can be accessed via the hypertext transfer protocol (HTTP/HTTPS). Phishing kit 260 includes a program or suite of programs that is usable by the malicious entity to perform a phishing attack. A "phishing" attack includes spoofing a login page of a legitimate website, and then collecting login information from users who unwittingly attempt to log into their accounts at the spoofed website.

For example, the malicious entity may send emails to a plurality of email addresses, the emails intended to appear as coming from the legitimate website with a request for the recipient to log into their account. A user that does not recognize the spoof and has an account at the spoofed website may select, using computer system 101, a link in the email that sends user request 220 to website 150. Phishing kit 260 receives user request 220 and responds with web page 255*a* that is configured to appear as a login page of the spoofed website. The user may enter, via computer system 101, login credentials such as a user identification (ID) and a password, which are then collected by phishing kit 260 for later use by the malicious entity. In some embodiments, the user may receive a response after entering their credentials that the website is not currently available and to try again later, thereby avoiding suspicion by the user and providing the malicious entity an opportunity to use the collected credentials to, for example, transfer funds from an account of the user to an account of the malicious entity, or to make purchases using an account of the user.

To combat such phishing attacks, several web-based entities operate anti-malware web crawler programs. As shown, web crawler 230 is an anti-malware scanner that is configured to send crawler requests to a plurality of URLs, and then to analyze respective responses from the corresponding websites associated with the addresses. Web crawler 230 determines whether indications of malicious behavior are include in the analyzed responses, and if so, may add the associated URL to a list of known and/or suspected malicious websites, e.g., a "deny-list." Creators of phishing kits, however, are aware of these anti-malware web crawlers, and have included defenses against detection, referred to herein as "anti-malware cloaking" techniques, or simply "cloaking." Cloaking includes determining that a received request for content originated from an anti-malware web crawler and instead of sending a web page spoofing a legitimate website, sends content that appears to be harmless.

In the illustrated example, web crawler 230 sends crawler request 225 to a particular http address linked to website 150 that is hosted by server computer system 250. Crawler request 225 is, in turn, is received by phishing kit 260. To guard against anti-malware web crawlers, phishing kit 260 includes cloaking techniques that identify crawler request 225 as originating from web crawler 230. To avoid detection by web crawler 230, phishing kit 260 sends web page 255*b* instead of web page 255*a*. As shown, web page 255*b* appears as an error message that the requested web page was not found. Various other types of non-malicious content may be sent in other embodiments, such as offers to sell the associated website address, error messages that the requested web page is currently unavailable, and other such content. Web crawler 230 may receive the content for web page 255*b* and subsequently determine that website 150 at the particular URL is not malicious. Website 150 may, therefore, continue to operate undetected.

Web page 225*a* in FIG. 2, illustrates an example of a type of malicious website referred to as a phishing site. Other types of malicious websites are contemplated and may be detected and/or avoided using the techniques disclosed herein. An example of use of the disclosed techniques is shown in FIG. 3.

Figure 3:
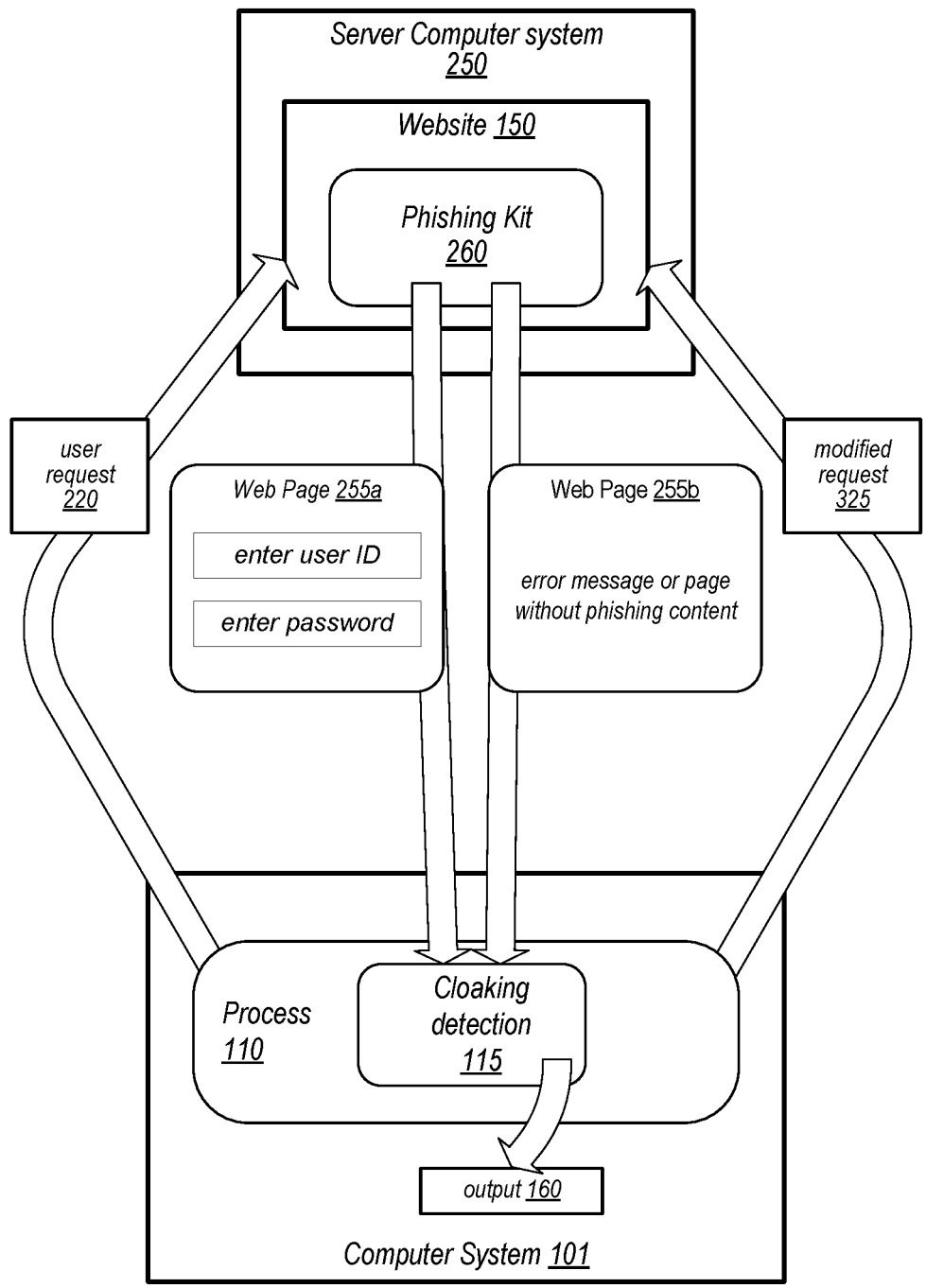
FIG. 3 depicts a block diagram of an embodiment of a computer system sending two different request for content from a same website.

Turning to FIG. 3, an example system illustrating use of a technique for identifying a malicious website is depicted. System 300 includes computer system 101 and server computer system 250. In a similar manner as shown in FIG. 2, server computer system 250 includes phishing kit 260, installed by a malicious entity. Computer system 101 includes process 110 and cloaking detection module 115. In some embodiments, computer system 101 includes a non-transitory computer-readable medium having instructions stored thereon that are executable within, for example, a browser on computer system 101 to perform operations associated with process 110 and/or cloaking detection module 115.

As illustrated, a user of computer system 101 requests access to website 150 by, for example, selecting a link on a web page or in an email, or by typing in a uniform resource locator (URL). In response to determining that a security risk of website 150 included in the received access request is undetermined, process 110 includes in modified request 325, one or more characteristics of an anti-malware scanner, and then sends modified request 325 to website 150.

Website 150 receives modified request 325, and in response to detecting at least one of the one or more characteristics of an anti-malware scanner included in modified request 325, sends web page 255*b* to computer system 101 in an attempt to cloak website 150 from a perceived anti-malware scanner. Cloaking detection module 115 receives web page 255*b* from website 150. Cloaking detection module 115, in various embodiments, is included within process 110, called from process 110, or a combination thereof. For example, a portion of cloaking detection module 115 may be included within process 110 and used to call other portions of cloaking detection module 115 that are installed separately on computer system 101 and/or on a different computer system, such as a computer system associated with an anti-malware protection service. In some embodiments, process 110, using cloaking detection module 115, determines, based on characteristics of web page 255*b*, that website 150 may be malicious.

In other embodiments, process 110 may send an unaltered version of user request 220 to website 150. User request 220 may be completely unaltered, or may be altered to obfuscate personal information of the user but otherwise avoid inclusion of characteristics of an anti-malware scanner. Phishing kit 260, after receiving user request 220, fails to detect any characteristics of an anti-malware scanner and in response, sends content corresponding to web page 255*a* to computer system 101. Process 110 receives this different response for user request 220 in the form of web page 255*a*. Cloaking detection module 115 compares web page 255*a* associated with user request 220 to web page 255*b* associated with modified request 325. Cloaking detection module 115 determines whether web page 255*b* includes anti-malware cloaking techniques based on the comparing. In the illustrated example, cloaking detection module 115 determines that web page 255a includes a request for account credentials while web page 255b includes an error message that the requested web page was not found. In some embodiments, this comparison may be performed at various points in time based on responses received from multiple computer systems operated by a variety of different users.

Based on this discrepancy, cloaking detection module 115 generates output 160 indicative of the determination. In response to output 160 indicating presence of cloaking techniques, process 110 may block, from a display of computer system 101, content received in the response of web pages 255a and 255b, and display instead a warning to the user of computer system 101 that the requested website 150 includes indications of being malicious. In some embodiments, the user may be presented an option to override the warning and display web page 255a. In other embodiments, website 150 may be added to a deny-list and process 110 may prevent content from website 150 from being displayed until website 150 is removed from the deny-list.

It is noted that FIG. 3 is merely an example for demonstrating the disclosed concepts. Only elements needed to describe the concepts have been illustrated. In other embodiments, additional elements may be included, such as an input device for the user to interact with computer system 101, networking circuits to couple computer system 101 and server computer system 250 to the internet, and the like.

FIGS. 1 and 3 describe use of altered requests by process 110 to trigger a malicious website to respond with cloaking techniques. Various characteristics of a web page request may trigger the cloaking techniques of a malicious website. Several of these characteristics are described below in regards to FIG. 4.

Figure 4:
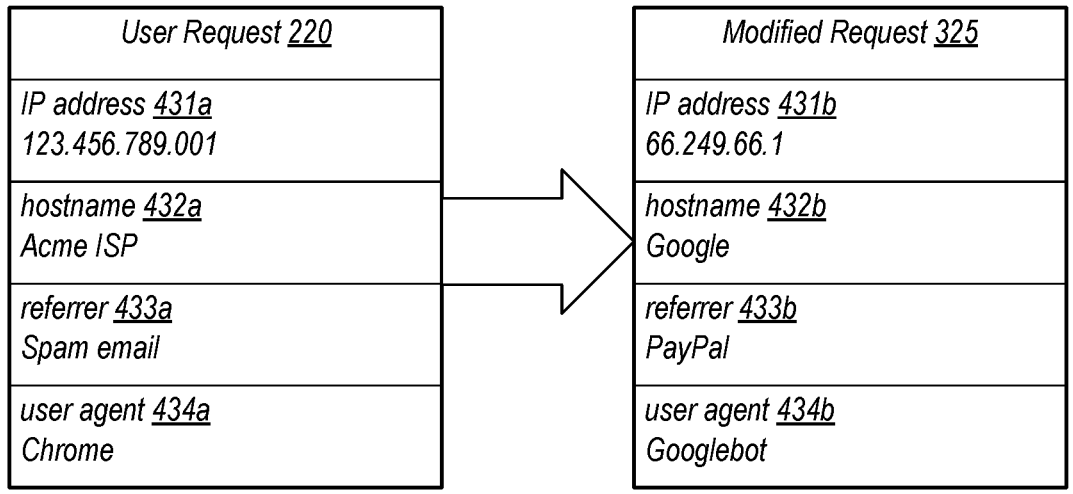
FIG. 4 illustrates two tables depicting examples of changes between a user request and an altered request.

Proceeding now to FIG. 4, two tables are shown, depicting elements of an unaltered user request and a modified version of the user request intended to trigger a cloaking response from a malicious website. User request 220 includes four characteristics: internet protocol (IP) address 431a, hostname 432a, referrer 433a, and user agent 434a. Modified request 325 includes altered versions of these four characteristics.

As illustrated, user request 220 corresponds to an unmodified user request to a website such as website 150 in FIGS. 1-3. User request 220 depicts characteristics that may be included in a request to a trusted website. IP address 431a is an IP address associated with computer system 101 and/or an internet service provider through which computer system 101 accesses the internet. Hostname 432a corresponds to a hostname or other identifier for the internet service provider associated with IP address 431a. Referrer 433a is an identifier of an origin of a link (e.g., URL) from which user request 220 is initiated. For example, a particular web page may include a link to website 150. Selecting this link may result in in the particular web page (identified, e.g., by a URL of the particular web page) being listed as referrer 433a. As shown, a spam email sent, for example, by the malicious entity operating website 150, is indicated as referrer 433a, indicating the user clicked a link included in the spam email. User agent 434a identifies a program executing on computer system 101 that generates user request 220 and sends user request 220 to website 150. In some embodiments, process 110 may be identified as user agent 434a, while in other embodiments, a program, such as a web browser (e.g., Chrome™, as shown) may be identified while process 110 is an extension operating within the web browser.

In order to generate modified request 325, process 110 selects characteristics of a particular anti-malware scanner to modify, including one or more of: IP address 431a, hostname 432a, referrer 433a, and user agent 434a. As illustrated, all four characteristics are modified. IP address 431a is changed to IP address 431b, wherein the value of IP address 431b is associated with a known anti-malware scanner. Hostname 432a is altered to hostname 432b, for example "Google," which operates Google SafeSearch™, including anti-malware scanners. Referrer 433a is modified to referrer 433b, e.g., an entity, such as PayPal, that is known to seek to identify and deny-list malicious websites. User agent 434a is revised to user agent 434b, to indicate, instead of a web browser, a name or term associated with anti-malware scanners.

As described above, process 110 may send modified request 325, and in some embodiments, unmodified user request 220, to website 150. Process 110 analyzes content received in response to the sent requests, determining whether any sent request triggered a cloaking response from website 150. Although all four illustrated characteristics are shown to be modified, any number of the characteristics may be modified in a given modified request. In some embodiments, process 110 may send multiple modified requests, and compare responses to identify differences and similarities that may be indicative of cloaking techniques.

It is noted that the table of FIG. 4 are merely examples. The four illustrated characteristics are not intended to be limiting, and therefore, additional and/or different characteristics may be modified to generate modified requests. An extent of the modifications may vary across embodiments. In some embodiments, additional components may be utilized to accomplish the modifications. For example, a proxy server may be used to modify an IP address.

FIGS. 1-4 illustrate systems and characteristics associated with malicious websites and techniques for identifying the malicious websites. These techniques may be implemented using a variety of processes. One such process is illustrated in FIG. 5.

Figure 5:
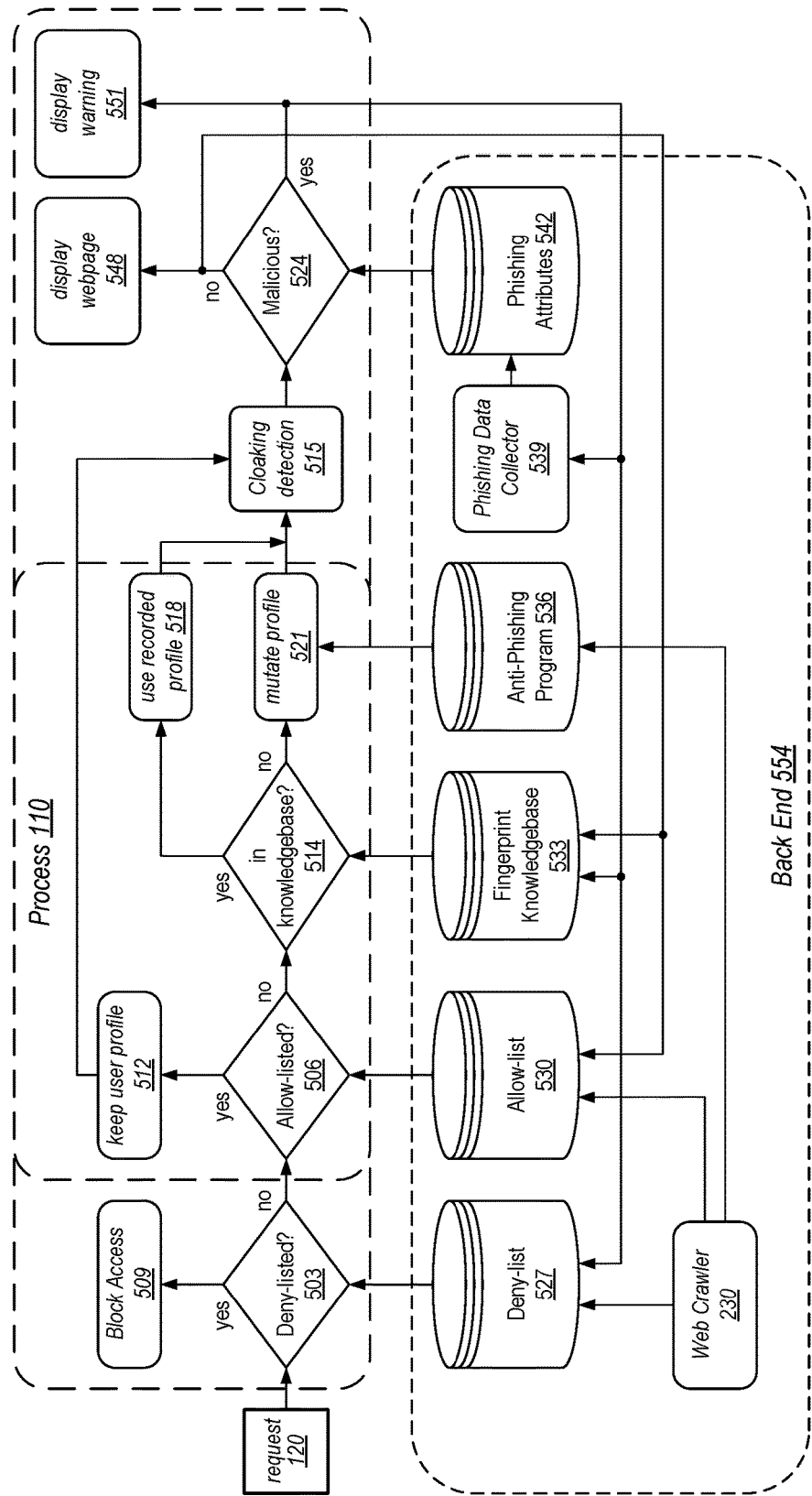
FIG. 5 shows a diagram of a process flow for identifying and blocking access to a malicious website.

Moving now to FIG. 5, an embodiment of a procedure for identifying malicious websites is illustrated. Procedure 500 may be implemented using hardware circuits, software programs, or a combination thereof. For example, procedure 500 may be implemented on computer system 101 by utilizing a non-transitory computer-readable medium having instructions stored thereon that are executable within computer system 101 to perform operations associated with procedure 500. Procedure 500 includes process 110 and back end 554. Process 110 includes blocks 506, 512, 515, 518, and 521. In some embodiments, process 110 may further include blocks 503, 509, 115, 524, 548, and 551. Back end 554 includes databases 527, 530, 533, 536, and 542. In addition, back end 554 includes web crawler 230 and phishing data collector 539.

As illustrated, process 110 is performed on a client computer system such as computer system 101 of FIGS. 1-3. In other embodiments, portions of process 110 may be performed by a different computer system, such as a computer system associated with back end 554. Back end 554, as shown, is included in one or more computer systems that are separate from computer system 101. In other embodiments, however, some or all of the elements of back end 554 may be included on a computer system that is performing process 110. Operations of procedure 500 are described below including references to FIGS. 1 and 3.

As illustrated, procedure 500 includes receiving request 120 from a user of computer system 101 to access website 150. Request 120 may be generated, for example, by the user selecting a link in a web page, email, or other type of program, or by typing in a URL in a browser. Operations performed on computer system 101 include accessing, by process 110, deny-list database 527. Deny-list database 527 includes one or more deny-lists of websites that have been determined to include malicious content. In block 503, process 110 determines whether website 150 is currently included in deny-list database 527 (e.g., whether website 150 is deny-listed). If deny-listed, then process 110 blocks access to website 150 in block 509. Otherwise, if website 150 is not deny-listed, then process 110 accesses allow-list database 530. Allow-list database 530 includes one or more allow-lists of websites on which no malicious content has been found. In block 506, process 110 determines whether website 150 is included in allow-list database 530. If website 150 is allow-listed, then process 110 prepares, in block 512, a request for website 150, including user information that is included in the received access request 120. In some embodiments, even if website 150 is allow-listed, process 110 may still include performing of cloaking detection actions in block 515.

It is noted that deny-lists and allow-lists included in respective databases 527 and 530 may be generated and/or updated based on results of web crawler 230 and, in some embodiments, other web crawlers with which back end 554 shares information. Web crawler 230 and other web crawlers may operate independently from procedure 500, providing information for updating deny-list database 527 and allow-list database 530 after the information becomes available. In some cases, a new deny-list or allow-list may become available and added to a respective one of databases 527 and 530. An entity that operate back end 554 may have agreements with operators of other web crawlers to share results, thereby increasing an amount of data available for maintaining the respective deny-lists and allow-lists.

If website 150 is not allow-listed, then process 110, based on the accessing of allow-list database 530 and deny-list database 527, determines that website 150 is unfamiliar, and therefore, a security risk of website 150 is undetermined. After determining that the security risk of website 150 is undetermined, process 110 accesses fingerprint knowledgebase 533. Unfamiliar websites are tracked in fingerprint knowledgebase 533. Prior attempts to trigger a cloaking response from a particular website may result in responses that are inconclusive, or a number of responses received from the particular website may be too few to make a deny-list or allow-list decision for the particular website. In such cases, these unfamiliar websites may be included in fingerprint knowledge base 533 along with information about profiles that have been used in the previous altered requests, including which characteristics have been previously altered and what value(s) have been used when altering these characteristics.

Process 110, in order to modify request 120 to generate altered request 122, accesses fingerprint knowledgebase 533 and determines, in block 514, if website 150 is included. Process 110 selects one or more characteristics to modify using the respective information included in fingerprint knowledgebase 533 as well as information included in request 120. If process 110 determines that website 150 is included in fingerprint knowledgebase 533, then to generate altered request 122, process 110 identifies and uses, in block 518, a recorded profile that has been previously used on website 150.

If process 110 determines that website 150 is not included in fingerprint knowledgebase 533, then process 110, in block 521, mutates (e.g., alters characteristics) a user profile 521, mutates (e.g., alters characteristics) a user profile included in request 120. To mutate the user profile, process 110 accesses anti-phishing program database 536. Anti-phishing program database 536 is a database that includes one or more characteristics of anti-malware scanners and respective information associated with these included characteristics. For example, various characteristics of anti-malware scanners, such as shown in FIG. 4, may be maintained and different values tracked for each of the various characteristics. In addition, for the various values, effectiveness of triggering cloaking techniques may be tracked. For example, a number of times that the value of "PayPal" is used as referrer 433b may be tracked along with a number of times that this value resulted in triggering a cloaking response from a malicious web site.

Process 110 generates and sends altered request 122 to website 150 and, in block 515, analyzes responses received from website 150. In some embodiments, multiple altered requests may be generated and sent, and corresponding responses received and analyzed. In block 524, process 110 makes a determination whether the response(s) from website 150 include indications of cloaking techniques. A result of this determination is indicated by output 160, generated by process 110. To make the determination, process 110 accesses phishing attributes database 542. Phishing attributes database 542 includes indications of cloaking techniques that have been detected in previously received responses to previously sent altered requests. In some embodiments, the information stored in phishing attributes database 542 may be confirmed by a system administrator or other operator of back end 554. In other embodiments, an automated system, such as phishing data collector 539, may be utilized to further analyze the information associated with the previously received responses and make a determination if attributes of various responses are indicative of cloaking, or other type of malware behavior. After making a decision that a particular one or more attributes are indicative of phishing, then these one or more attributes are cataloged in phishing attributes database 542 for use in identifying additional malicious websites.

If no indications of cloaking are detected, then process 110 displays, in block 548, content for a web page included in the response to the user request. Otherwise, if evidence of cloaking is detected, then, in block 551, process 110 displays a warning to the user that the requested website 150 may be malicious. In some embodiments, process 110 may include an option for the user to disregard the warning and proceed to display the content from website 150. This option may be presented in particular cases in which a risk factor is determined for website 150 and the risk factor satisfies a first threshold indicating a possibility of malicious behavior, but fails to satisfy a second threshold indicating an unacceptable risk of malicious behavior.

In addition, process 110 may update one or more of the databases based on the generated output 160. For example, process 110 may update, in fingerprint knowledgebase 533 based on the outcome of the request, the respective information associated with the selected one or more characteristics used to generate altered request 122. If no entry for website 150 was previously included in fingerprint knowledgebase 533, then a new entry is created, including indications of which characteristics were modified in altered request 122, what values were used in the modifications, and results of the analysis of the response to altered request 122. Furthermore, if malicious behavior of website 150 is suspected, then phishing data collector 539 may be collect the relevant data and update phishing attributes database 542. In addition, if website 150 is determined, with high confidence, to be malicious, then deny-list database 527 may be updated to include website 150. Similarly, if website 150 is determined, with high confidence, to be legitimate, then allow-list database 530 may be updated accordingly.

It is noted that procedure 500 is one example for demonstrating the disclosed concepts. Other embodiments are contemplated. For example, although one process (process 110) is described in regards to procedure 500. In other embodiments, the described actions may be distributed across multiple processes, associated with one or more programs operating on computer system 101, and in some embodiments, additional computer systems. Five databases are described in FIG. 5. In other embodiments, the information described for these five databases may be included in any suitable number of storage devices (e.g., one, two, five, sixteen, etc.) and these storage devices may be included in back end 554 or may be included in a different anti-malware system that is accessible by computer system 101. For example, information stored in some or all of the illustrated databases may be shared by multiple entities operating respective anti-malware systems.

FIGS. 1-5 describe systems and procedures for performing malware detection techniques. These techniques may be implemented using a variety of methods, FIGS. 6-8 depict three methods that may be utilized in an anti-malware system.

Figure 6:
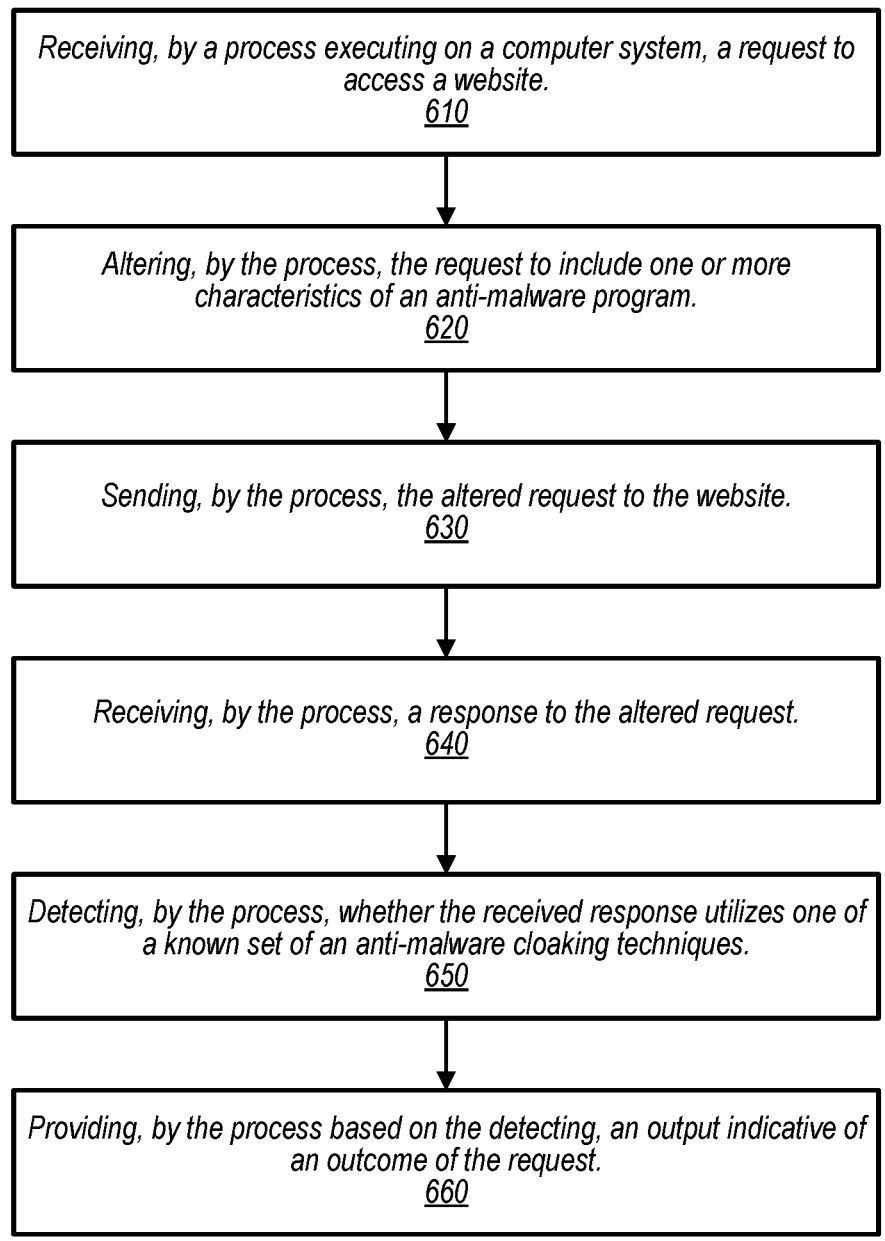
FIG. 6 depicts a flow diagram of an embodiment of a method for identifying a malicious website.
Figure 7:
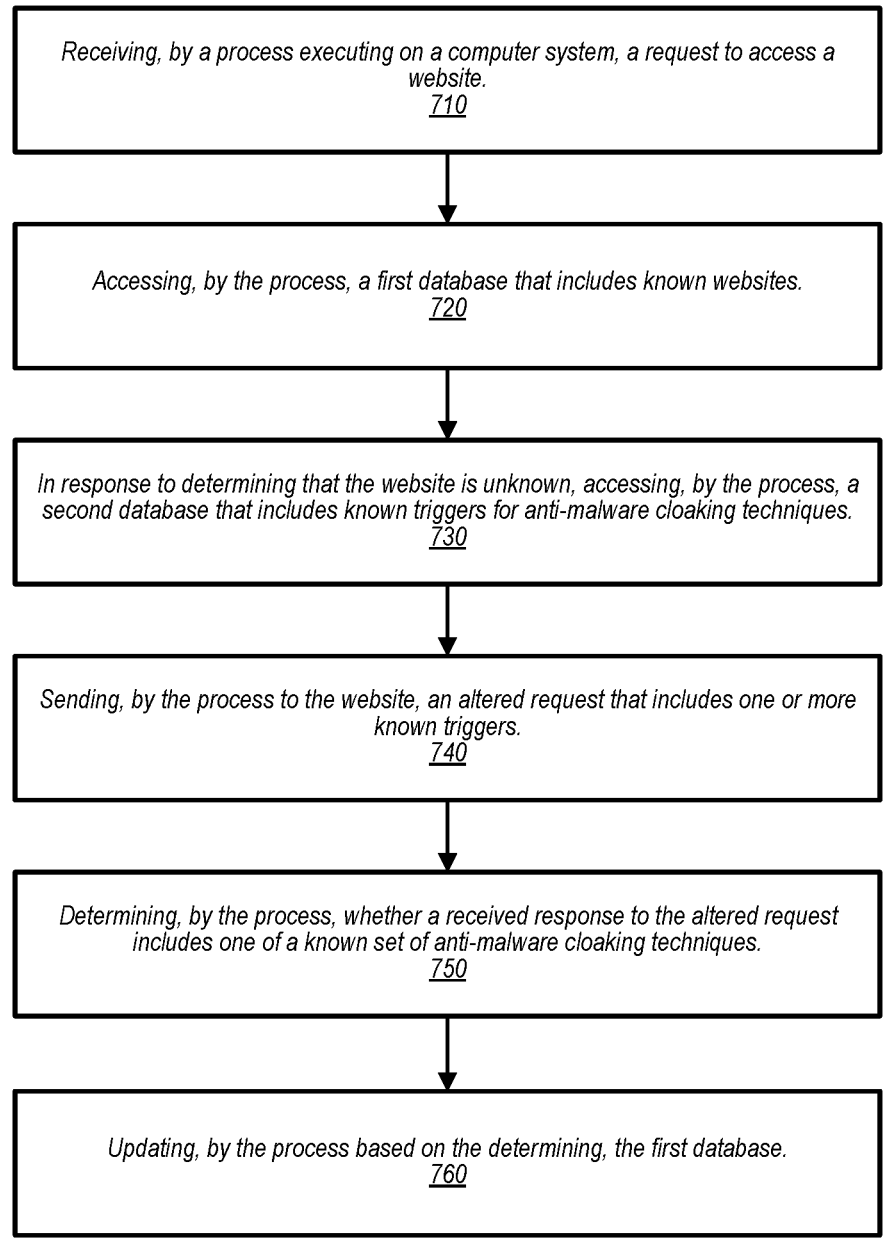
FIG. 7 illustrates a flow diagram of an embodiment of a method for using databases for identifying and tracking malicious websites.

Turning now to FIG. 6, a flow diagram of an embodiment of a method for detecting anti-malware cloaking techniques used by a website is illustrated. In various embodiments, method 600 may be performed by computer system 101 in FIGS. 1-3. For example, computer system 101 may include (or have access to) a non-transitory, computer-readable medium having program instructions stored thereon that are executable by the computer system to cause the operations described with reference to FIG. 6. Referring collectively to FIG. 1 and method 600 in FIG. 6, the method begins in block 610.

Method 600, in block 610, includes receiving, by process 110 executing on computer system 101, request 120 to access website 150. As shown, a user may select a link or type a URL into a web browser or other type of program executing on computer system 101, thereby generating request 122 that is received by process 110. In various embodiments, process 110 may be a part of a program such as a web browser, social media application, online shopping application, online financial application, or any similar application capable of accessing a URL over the internet. In other embodiments, process 110 may be an extension or other form of applet that is added to and executes within another program.

Website 150, as illustrated, is unknown to process 110 and may be unknown to other processes running on computer system 101. Due to the unknown nature, website 150 presents a potential security risk to private information associated with the user. As described above, some websites may be operated by malicious entities with the intent to trick unsuspecting users into divulging sensitive information, such as login credentials, or allowing the malicious entity to install a program on computer system 101 that provides the entity with access to information stored on computer system 101 or gives the entity control of computer system 101, such as spyware or ransomware.

At block 620, method 600 further includes altering, by process 110, request 120 to include one or more characteristics of anti-malware scanners. In response to the potential security risk of accessing the unknown website 150, process 110 alters request 120 to include one or more characteristics of an anti-malware scanner. By including at least one characteristic of an anti-malware scanner, the resulting altered request 122 may cause website 150 to respond using one or more cloaking techniques, if website 150 is malicious.

Method 600 also includes, at block 630, sending, by process 110, altered request 122 to website 150. As shown, process 110 sends altered request 122 to website 150 in place of, or in addition to, an unaltered version of request 120. In some embodiments, multiple versions of altered request 122 may be generated and sent, each version including a different combination of altered content.

Method 600, at block 640, also includes receiving, by process 110, response 155 to altered request 122. Website 150, as depicted, responds to altered request 122 with response 155. If website 150 is a legitimate website, then response 155 may include content for a webpage associated with website 150, such as a home page, an account login page, and the like. If multiple versions of altered request 122 are sent, then each respective response may be the same, or in some cases may include some legitimate differences. For example, website 150 may modify a home page or login page for specific users, for users in particular geographic regions, for users of particular devices, or in response to other characteristics included in the respective request. In some cases, a website may send a mobile version of their home page if the associated altered request included an indication that the request was generated on a mobile device.

At block 650, method 600 includes detecting, by process 110, whether the received response 155 utilizes one of a known set of anti-malware cloaking techniques. Process 110, as illustrated, analyzes response 155 to determine if received content includes any indication of cloaking. For example, a response that includes a web page not found error may be an indication of cloaking. Such a response, however, may alternatively be a legitimate error message if, for example, the user mistyped a URL in request 120 or if website 150 is genuinely unreachable due to technical or other issues. In some embodiments, process 110 may generate a different altered request and compared a response to the different altered request to response 155. As described above, some differences between responses may be acceptable for a legitimate website, while other differences are not expected. For example, if response 155 is the aforementioned error message and the different response is an account login page, then process 110 may flag website 150 as malicious.

Method 600 further includes, at block 660, providing, by process 110 based on the detecting, output 160 indicative of an outcome of altered request 122. After analyzing response 155 and any additional responses, if applicable, process 110 make a determination on the security risk of website 150 and generates output 160 that is indicative of the determined risk. In some embodiments, output 160 may include a simple "safe"/"not safe" indication. In other embodiments, a range of values may be utilized based on a confidence level that website 150 is legitimate or malicious. For example, output 160 may be set to a value between zero to ten, with zero indicative of a definitively malicious website and ten indicative of a definitively safe website. Other methods for ranking safety of a website are known and contemplated.

It is noted that the method of FIG. 6 includes elements 610-660. Method 600 may be repeated in response to subsequent website access requests. In some cases, method 600 may be performed concurrently with itself, for example, if processing of multiple requests overlap. In such cases, two or more processor cores, or process threads in a single core, in computer system 101 may perform method 600 independently from one another. In other embodiments, multiple performances of method 600 may work coherently, sharing respective outputs 160. Although six blocks are shown for method 600, additional blocks may also be included in other embodiments. For example, one or more additional blocks may be included for generating a plurality of altered requests to the website.

Proceeding now to FIG. 7, a flow diagram of an embodiment of a method for utilizing databases for detecting anti-malware cloaking techniques is depicted. Method 700 may be performed by computer system 101 in FIGS. 1-3. In some embodiments, computer system 101 may, for example, include (or have access to) a non-transitory, computer-readable medium having program instructions stored thereon that are executable by the computer system to cause the operations described with reference to FIG. 7. Referring collectively to FIGS. 3, 5, and 7, method 700 begins in block 710.

Method 700, at block 710, includes receiving, by process 110 executing on computer system 101, request 120 to access website 150. As previously described, a user may cause request 120 to be generated on computer system 101 and received by process 110. The request includes a URL or other identifying information corresponding to website 150.

Method 700 further includes, at block 720, accessing, by process 110, a first database that indicates security risks of websites that have been classified. As shown, process 110 determines whether website 150 is identified within one or more deny-lists included in deny-list database 527. In some embodiments, the first database may include one or more additional databases, such as allow-list database 530. As previously described, deny-list database 527 includes one or more deny-lists that may be used to identify websites that have been determined to pose a substantial security risks to users. Similarly, allow-list database 530 includes one or more allow-lists that may be used to identify websites on which no indications of malicious behavior have been detected. The one or more deny-lists and allow-lists may be maintained by the same entity that operates back end 554 or maintained by other entities with which the entity operating back end 554 has a data sharing agreement.

In addition to the deny-lists and allow-lists, process 110 may access fingerprint knowledgebase 533 that includes results from previous attempts to identify malicious websites. If website 150 is included in fingerprint knowledgebase 533, then information associated with previous attempts to determine if website 150 exhibits malicious behavior may be used to alter request 120. These previous attempts may not have generated adequate responses from website 150 to make a high confidence determination whether website 150 is safe or malicious. If prior information exists for website 150, then any alterations to request 120 may utilize this prior information in order to generate a new response that may increase the awareness of process 110 to the safety or maliciousness of website 150. If website 150 is not included in fingerprint knowledgebase 533, then a new entry may, in some embodiments, be created. In other embodiments, a new entry may not be created until output 160 is generated.

At block 730, method 700 includes, in response to determining that a security risk of website 150 is undetermined, accessing, by process 110, anti-phishing program database 536 that includes known triggers for anti-malware cloaking techniques. After accessing the first database, process 110, as illustrated, determines that no identifying information for website 150 is included in the first database, and that website 150 is, therefore, unknown to process 110. Process 110, accordingly, considers website 150 as an unknown security risk to the user and performs one or more attempts to determine if website 150 utilizes any cloaking techniques. To perform these one or more attempts, process 110 accesses anti-phishing program database 536. As previously described, anti-phishing program database 536 includes information regarding characteristics of known anti-phishing programs. In addition, information regarding effectiveness during prior use of the characteristics is included.

Method 700, at block 740, also includes sending, by process 110 to website 150, modified request 325 that includes one or more known triggers. As depicted, process 110 generates an altered request from request 120 (e.g., altered request 122 in FIG. 1 or modified request 325 in FIG. 3). To alter request 120, process 110 selects one or more characteristics from anti-phishing program database 536, and determines values to use based on included information associated with the selected characteristics. In some embodiments, anti-phishing program database 536 also may include a complete or partial profile to use with an altered request. For example, a particular set of characteristics, and in some cases, values to use for the particular set, may be included and selected by process 110. After process 110 has altered request 120, the altered request is sent to website 150.

At block 750, method 700 further includes determining, by process 110, whether a received response to modified request 325 includes one of a known set of anti-malware cloaking techniques. In response to the altered request, website 150 sends a response that may include web page content and/or other information. If a phishing kit operating within website 150 detects the anti-phishing characteristics included in the altered request, then website 150 may send a response that includes one or more cloaking techniques, such as an error message. Otherwise, if website 150 does not detect the anti-phishing characteristics, then website 150 may respond with content for a web page that attempts to extract sensitive information from the user. Process 110 analyzes responses sent by website 150, and based on the received content, generates an output 160 to provide an indication of whether website 150 includes anti-malware cloaking techniques. As disclosed above, output 160 may provide a safe/not safe indication, or may include a range of values corresponding to a confidence level that website 150 is safe or not.

Method 700 also includes, at block 760, updating, by process 110 based on the determining, the first database. Process 110, as shown, may update deny-list database 527 and/or allow-list database 530 based on the result of output 160. For example, if output 160 indicates a high level of confidence that website 150 uses cloaking techniques, then website 150 may be added to one or more deny-lists. Similarly, if output 160 indicates a high level of confidence that website 150 is safe, then website 150 may be added to one or more allow-lists. In addition, process 110 may update, based on the value of output 160, anti-phishing program database 536 to add information such as details of website 150, the altered request, whether the altered characteristics resulted in receiving indications of cloaking techniques, and other relevant information that may help increase an ability of process 110 to detect malicious behavior when sending a subsequent altered request. Method 700 may end in block 760, or may repeat one or more of the operations to generate additional responses from website 150.

It is noted that the method of FIG. 7 includes elements 710-760. Method 700 may be repeated in response to subsequent access requests. In some cases, method 700 may be performed by one or more processor cores in the computer system in response to receiving multiple access requests. Multiple performances of method 700 may work independently or coherently, e.g., by using collected responses to generate new altered requests. A different number of operations may also be included in other embodiments of method 700. For example, an additional operations may be included for accessing additional databases after block 720.

Proceeding now to FIG. 8, a flow diagram of an embodiment of a method for generating additional altered requests and receiving additional responses from a website is illustrated. Method 800 may be performed by computer system 101 in FIGS. 1-3, and in some embodiments, may be performed concurrently with methods 600 or 700. In some embodiments, for example, method 800 may be performed as operations included in block 750 of method 700. Computer system 101 may, in some embodiments, include (or have access to) a non-transitory, computer-readable medium having program instructions stored thereon that are executable by the computer system to cause the operations described with reference to FIG. 7. Referring collectively to FIGS. 3 and 8, method 800 begins in block 810, after operations of block 740 of method 700 have been performed.

Method 800, at block 810, includes sending, by process 110, a different request that includes at least one different known trigger for anti-malware cloaking techniques than the altered request sent in block 740 of method 700. In some embodiments, the different request is sent in response to determining that the response received in block 750 of method 700 has no indications of use of an anti-malware cloaking technique. In other embodiments, the different request may be sent before the response is received in block 750, or may be sent after receiving the response but sent regardless of indications of cloaking. For example, process 110 may determine to send multiple altered requests to website 150 prior to sending the first altered request in block 740. In some embodiments, a different request that is not altered may be sent, or the different response may be altered to protect an identity of the user, but not to include characteristics of anti-malware scanners. Such different request may be sent with a goal of not triggering cloaking techniques and instead to receive a response that includes malicious behavior, such as a request from website 150 for login credentials, as depicted by web page 255a in FIGS. 2 and 3.

At block 820, method 800 includes receiving, by process 110, a different response to the different request. As shown, the particular response received in block 750, the altered request having triggered a cloaking response by website 150, may correspond to web page 255b. The different response, due to the different request not triggering a cloaking response, may correspond to web page 255a.

Method 800, further includes, at block 830, comparing the particular response to the different response. Process 110 receives the particular response and the different response, and compares received content for each response. In the event that one response includes clocking techniques while the other response doesn't, there may be significant differences between the two responses. If no cloaking techniques are utilized by website 150 for either response, or cloaking is triggered for both responses, then the content may be very similar. In some cases in which no cloaking is triggered for either response, the particular and the different response may still have some differences. For example, some content, such as ads, or content that is personalized by particular users, differences between the altered request and the different request may result in differences between the particular response and the different response. Process 110, using cloaking detection module 115, may distinguish between response differences that are legitimate (e.g., personal preferences, regional differences, platform differences such as different user agents, and the like) and differences due to cloaking techniques.

Method 800, at block 840, also includes detecting differences between the received response and the different response. In the example of FIG. 3, web page 255a includes a request for login credentials while web page 255b includes a web page not found error message. Such differences may be a strong indication of cloaking. In some embodiments, process 110 may also send additional requests with various altered characteristics based on currently received responses. For example, process 110 may send another request to website 150 in order to determine if the error message is a genuine error or part of a cloaking technique. After an adequate amount of information is gathered for the current user request, process 110 generates output 160 as previously described. In some cases, the adequate amount of information may correspond to a confident determination regarding the safety of website 150, while in other cases, the adequate amount of information may result in a value of output 160 that is indicative of a low confidence determination of safety or maliciousness.

At block 850, method 800 further includes blocking, from a display of the computer system, content received in the response. In response to a value of output 160 that indicates use of cloaking by website 150 (e.g., the value of output 160 satisfies a particular threshold value), process 110, as illustrated, prevents received content from being presented to the user. In particular, if a response to an unaltered request includes elements for requesting credentials from the user, or if the content includes one or more program instructions that may be executable by computer system 101, then process 110 prevents such content from being displayed and/or executed.

Method 800 also includes, at block 860, displaying, on the display, a warning to the user of computer system 101. If the value of output 160 satisfies the particular threshold, then process 110 displays a warning to the user that indications of cloaking techniques have been detected and the requested website 150 may not be safe. In some embodiments, different threshold values may be used for blocking content in block 850 and displaying a warning message in block 860. For example, content form website 150 may, in some embodiments, only be blocked when the value of output 160 indicates a high likelihood of malicious behavior by website 150. In cases in which the value of output 160 indicates a low or medium likelihood of malicious behavior, the warning message may be displayed on top of content from website 150. In cases in which content from website 150 is blocked from display, process 110 may, in some embodiments, provide an option for the user to override the blocking and display the content from website 150 despite the likelihood of malicious behavior.

The method of FIG. 8, it is noted, includes elements 810-860. Method 800, or a portion thereof, may be repeated to generate additional requests to the requested website. Method 800 may, in some cases, be performed in parallel with all or portions of method 600 or 700, by using one or more processor cores in computer system 101. For example, if process 110 determines that multiple altered requests are to be sent, then concurrent processes may be used to generate the multiple requests in an overlapping manner.

Figure 9:
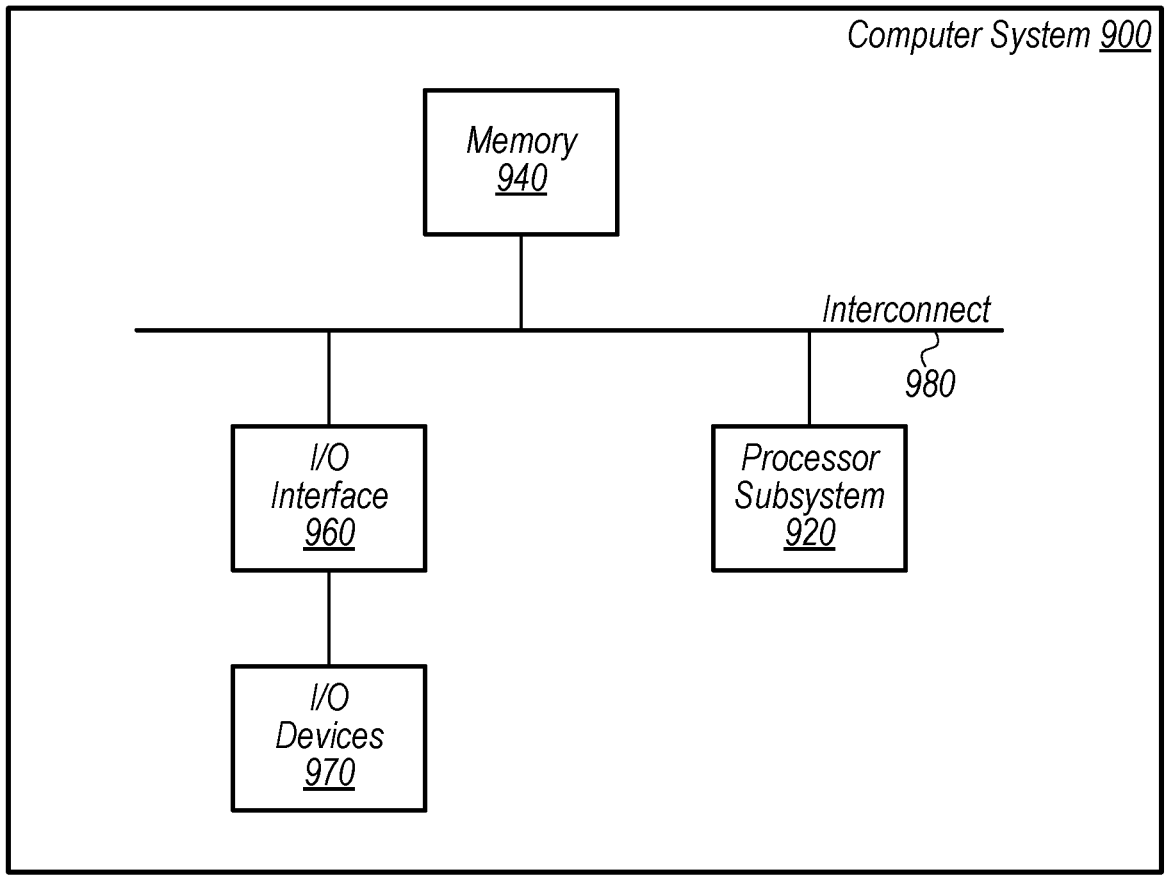
FIG. 9 is a block diagram illustrating an example computer system, according to some embodiments.

Referring now to FIG. 9, a block diagram of an example computer system 900 is depicted. Computer system 900 may, in various embodiments, implement one or more of the disclosed computer systems, such as computer system 101 in FIGS. 1-3 and/or server computer system of FIGS. 2 and 3. Computer system 900 includes a processor subsystem 920 that is coupled to a system memory 940 and I/O interfaces(s) 960 via an interconnect 980 (e.g., a system bus). I/O interface(s) 960 is coupled to one or more I/O devices 970. Computer system 900 may be any of various types of devices, including, but not limited to, a server computer system, personal computer system, desktop computer, laptop or notebook computer, mainframe computer system, server computer system operating in a datacenter facility, tablet computer, handheld computer, smartphone, workstation, network computer, etc. Although a single computer system 900 is shown in FIG. 9 for convenience, computer system 900 may also be implemented as two or more computer systems operating together.

Processor subsystem 920 may include one or more processors or processing units. In various embodiments of computer system 900, multiple instances of processor subsystem 920 may be coupled to interconnect 980. In various embodiments, processor subsystem 920 (or each processor unit within 920) may contain a cache or other form of on-board memory.

System memory 940 is usable to store program instructions executable by processor subsystem 920 to cause computer system 900 perform various operations described herein. System memory 940 may be implemented using different physical, non-transitory memory media, such as hard disk storage, floppy disk storage, removable disk storage, flash memory, random access memory (RAM-SRAM, EDO RAM, SDRAM, DDR SDRAM, LPDDR SDRAM, etc.), read-only memory (PROM, EEPROM, etc.), and so on. Memory in computer system 900 is not limited to primary storage such as system memory 940. Rather, computer system 900 may also include other forms of storage such as cache memory in processor subsystem 920 and secondary storage on I/O devices 970 (e.g., a hard drive, storage array, etc.). In some embodiments, these other forms of storage may also store program instructions executable by processor subsystem 920.

I/O interfaces 960 may be any of various types of interfaces configured to couple to and communicate with other devices, according to various embodiments. In one embodiment, I/O interface 960 is a bridge chip (e.g., Southbridge) from a front-side to one or more back-side buses. I/O interfaces 960 may be coupled to one or more I/O devices 970 via one or more corresponding buses or other interfaces. Examples of I/O devices 970 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 970 includes a network interface device (e.g., configured to communicate over WiFi, Bluetooth, Ethernet, etc.), and computer system 900 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

As used herein, a "module" refers to software and/or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as operable to perform operations refers to both a software and a hardware module.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority hereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    receiving, by a process executing on a computer system, a request from a user to access a website;
    prior to accessing the website, accessing, by the process, one or more of a plurality of databases to determine a security risk of the website, wherein the plurality of databases includes an allow-list of determined safe websites and a deny-list of determined malicious websites;
    in response to determining that the website is included in neither the allow-list nor the deny-list, accessing a different database that includes records of previous analysis attempts, including:
        triggers used in the previous analysis attempts and corresponding website responses, wherein insufficient information was collected to determine security risks; and
        trigger effectiveness metrics, including a confidence level indicative of a likelihood hat a particular trigger resulted in a response that utilized one of a known set of anti-malware cloaking techniques;
    in response to determining that the website is included in the different database, altering, by the process, the request to include one or more characteristics of anti-malware scanners that are known to cause a malicious website to send a response using an anti-malware cloaking technique, wherein the altering includes selecting triggers based on the records stored in the different database;
    sending, by the process, the altered request to the website;
    receiving, by the process, a response to the altered request;
    detecting, by the process, whether the received response utilizes one of the known set of anti-malware cloaking techniques;
    providing, by the process based on the detecting, an output indicative of an outcome of the altered request; and
    adding, by the process to the different database, information related to the altered request including the output.

2. The method of claim 1, further comprising:
    determining, by the process, whether the added information satisfies a threshold amount of information to move the website from the different database to the allow-list or the deny-list.

3. The method of claim 1, further comprising:
    sending, by the process, an unaltered version of the request to the website; and
    receiving a different response for the unaltered request.

4. The method of claim 3, wherein the detecting includes comparing, by the process, the received response to the different response.

5. The method of claim 1, wherein selecting the triggers based on the records stored in the different database includes:
    accessing the records of previous analysis attempts directed to the requested website; and
    selecting one or more triggers used in the previous analysis attempts based on information included in the received request.

6. The method of claim 5, further comprising updating, by the process, the records of the previous analysis attempts based on the outcome of the altered request.

7. The method of claim 1, wherein the process is a plug-in module for a web browser installed on the computer system.

8. The method of claim 1, further comprising:
comparing the output to a plurality of thresholds; and
determining a response to the user based on the comparing.

9. A non-transitory computer-readable medium having instructions stored thereon that are executable within a browser on a computer system to perform operations comprising:
receiving, from the browser, an access request for a website;
prior to accessing the website, accessing one or more of a plurality of databases to determine a security risk of the website, wherein the plurality of databases includes an allow-list of determined safe websites and a deny-list of determined malicious websites;
in response to determining that a security risk of the website is undetermined, accessing a different database that includes records of previous attempts to analyze websites, including:
triggers used in previous attempts and corresponding website responses, wherein insufficient information was collected to determine security risks; and
trigger effectiveness metrics, including a confidence level indicative of a likelihood that a particular trigger resulted in a response that utilized one of a known set of anti-malware cloaking techniques;
in response to determining that the website is included in the different database, modifying the access request to include one or more triggers that include characteristics of anti-malware scanners known to cause a malicious website to send a response using an anti-malware cloaking technique, wherein the modifying includes selecting triggers based on the records stored in the different database;
sending the modified access request to the website;
in response to receiving a reply to the modified access request, determining whether the reply includes one of the known set of anti-malware cloaking techniques;
generating an output indicative of a likelihood of malicious behavior by the website; and
adding, to the different database, information related to the modified access request, including the output.

10. The non-transitory computer-readable medium of claim 9, wherein determining that the security risk of the website is undetermined includes:
accessing a database of the one or more databases that includes the deny-list of websites that have been determined to include malicious content; and
determining that the website is currently excluded from the deny-list.

11. The non-transitory computer-readable medium of claim 9, wherein determining that the security risk of the website is undetermined includes:
accessing a database of the one or more databases that includes the allow-list of websites on which no malicious content has been found; and
determining that the website is currently excluded from the allow-list.

12. The non-transitory computer-readable medium of claim 9, wherein determining whether the reply includes anti-malware cloaking techniques includes:

sending an unmodified version of the received access request to the website; and
comparing a different reply associated with the unmodified access request to the reply to the modified access request; and
determining whether the reply includes anti-malware cloaking techniques based on the comparing.

13. The non-transitory computer-readable medium of claim 9, wherein determining whether the reply includes anti-malware cloaking techniques includes:
in response to receiving the reply to the modified access request, determining a number of replies from the website exceeds a threshold number.

14. The non-transitory computer-readable medium of claim 9, wherein the operations further comprise determining whether the added information satisfies a threshold amount of information to move the website from the different database to the allow-list or the deny-list.

15. A method comprising:
receiving, by a process executing on a computer system, a request to access a website;
accessing, by the process, a first database that list includes respective malicious and safe lists of websites that have been classified;
in response to determining that the requested website is excluded from both the malicious and safe lists, accessing, by the process, a second database that includes records of previous analysis attempts, including:
triggers used in the previous analysis attempts to detect malicious behavior and corresponding website responses, wherein insufficient information was collected to determine security risks; and
trigger effectiveness metrics, including a confidence level indicative of a likelihood that a particular trigger resulted in a response that utilized one of a known set of anti-malware cloaking techniques;
in response to determining that the second database includes results associated with the requested website, retrieving, by the process from the second database, information about the previous analysis attempts associated with the requested website;
generating, by the process, an altered request that includes triggers selected based on one or more of the triggers retrieved from the second database;
sending, by the process to the website, the altered request;
receiving, by the process from the website, a response that includes information for a web page;
determining, by the process, whether the received information for the web page includes one of the known set of anti-malware cloaking techniques; and
updating, by the process based on the determining, the first database.

16. The method of claim 15, further comprising updating, by the process based on the determining, the second database.

17. The method of claim 15, further comprising, in response to determining that the response to the altered request includes at least one anti-malware cloaking technique:
blocking, from a display of the computer system, content received in the response; and
displaying, on the display, a warning to a user of the computer system.

18. The method of claim 15, further comprising:
sending a different request that includes at least one different known trigger for anti-malware cloaking techniques than the altered request; and
receiving a different response to the different request.

19. The method of claim 18, wherein determining that the received response includes at least one anti-malware cloaking technique includes:
comparing the received response to the different response; and
detecting differences between the received response and the different response.

20. The method of claim 18, wherein the different request is sent in response to determining that the received response has no indications of anti-malware cloaking technique.

* * * * *

UNITED STATES PATENT AND TRADEMARK OFFICE
CERTIFICATE OF CORRECTION

PATENT NO. : 12,363,161 B2
APPLICATION NO. : 17/079190
DATED : July 15, 2025
INVENTOR(S) : Adam Oest et al.

Page 1 of 1

It is certified that error appears in the above-identified patent and that said Letters Patent is hereby corrected as shown below:

In the Claims

In Column 20 (Claim 1), Line 26, please delete "likelihood hat a" and insert -- likelihood that a --.

Signed and Sealed this
Twelfth Day of August, 2025

Coke Morgan Stewart
*Acting Director of the United States Patent and Trademark Office*